United States Patent [19]

Behnke

[11] 4,137,822
[45] Feb. 6, 1979

[54] MANDREL FOR RECEIVING THE TOOL IN A HOBBING MACHINE OR A SIMILAR MACHINE

[75] Inventor: Horst Behnke, Zorneding, Fed. Rep. of Germany

[73] Assignee: Carl Hurth Maschinen-und Zahnradfabrik, Munich, Fed. Rep. of Germany

[21] Appl. No.: 789,827

[22] Filed: Apr. 22, 1977

[30] Foreign Application Priority Data

May 21, 1976 [DE] Fed. Rep. of Germany ...................... 7616406 [U]

[51] Int. Cl.² ............................ B23Q 3/14; B23F 5/22
[52] U.S. Cl. .......................................... 90/11 A; 90/4
[58] Field of Search ................... 90/11 A, 11 D, 20.5, 90/4; 279/4

[56] References Cited

U.S. PATENT DOCUMENTS

| 3,242,818 | 3/1966 | Kastler | 90/11 A |
| 3,249,015 | 5/1966 | Schuster et al. | 90/11 A |

Primary Examiner—Horace M. Culver
Attorney, Agent, or Firm—Blanchard, Flynn, Thiel, Boutell & Tanis

[57] ABSTRACT

A mandrel for receiving the tool of a tool machine which has cones on both ends thereof for centering the mandrel in a tool machine spindle. Securing structure is provided for securing the mandrel to the tool machine spindle so that rotational drive is provided therefor. A stop is provided on one end of the mandrel intermediate the two cones and a cylinder-like device is provided at the end remote therefrom but also spaced inwardly from the cones. A piston is reciprocably mounted in the cylinder and engages a tool mounted on the mandrel. An application of pressure to the cylinder will cause an axial movement of the piston to engage the tool to effect a clamping of the tool between the stop and the aforementioned piston.

6 Claims, 1 Drawing Figure

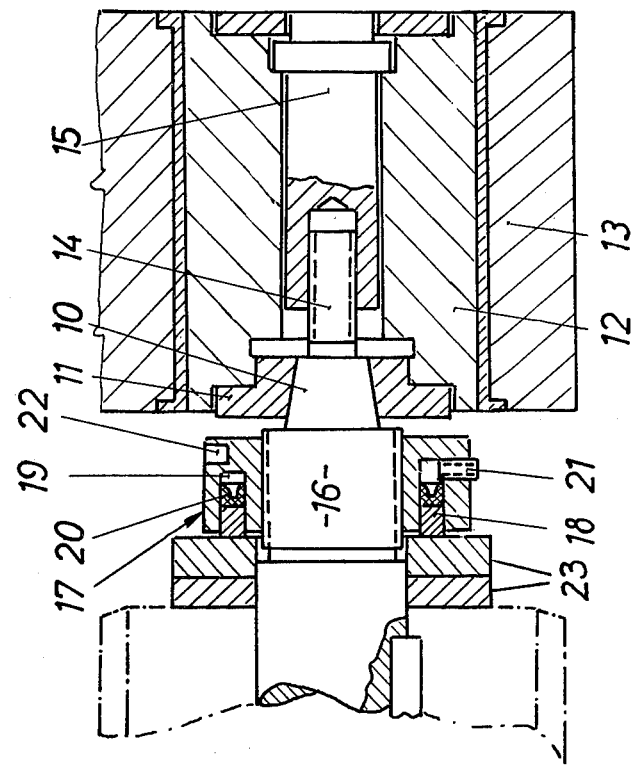
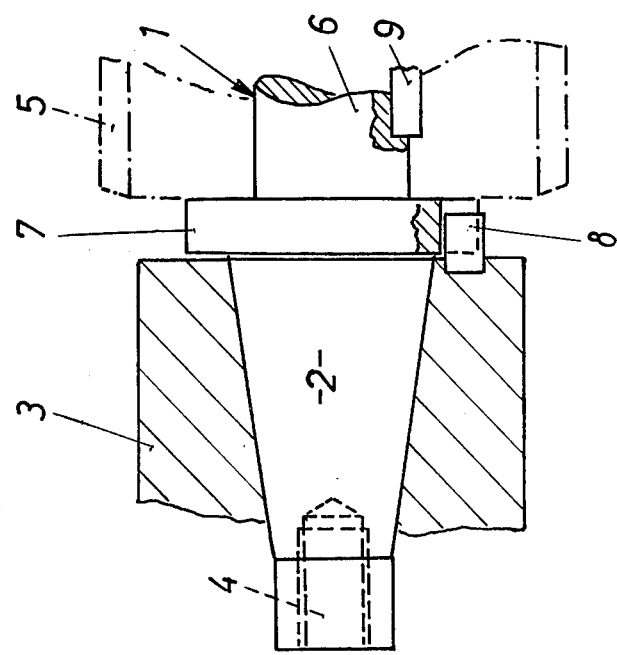

4,137,822

MANDREL FOR RECEIVING THE TOOL IN A HOBBING MACHINE OR A SIMILAR MACHINE

FIELD OF THE INVENTION

The invention relates to a mandrel for supporting the tool of a hobbing machine or a similar type of machine and which has on both ends thereof a cone shaped portion, each cone being provided for centering and effecting a clamping of the tool in the tool machine spindle or in a support bearing and, in addition, an external thread for receiving a tightening nut for the axial clamping of the tool on the mandrel.

BACKGROUND OF THE INVENTION

The basic purpose of the invention is to provide a mandrel of the above-described type, which assures a simple and deformation-free or at least a minimum deformation clamping of the tool, in particular a hob, in the tool machine. The draw-in spindle which is otherwise often used for this purpose and which extends axially through the mandrel is to be purposefully avoided. The purpose of the deformation-free or minimum deformation clamping assures that operation is performed with a tightening torque which is as small as possible on the nut and yet at a clamping force which is high in spite of it.

BRIEF DESCRIPTION OF THE DRAWING

Further advantages and characteristics of the invention can be taken from the following description and the accompanying drawing, in which:

The single FIGURE is a central sectional view of the hob supporting mandrel and the support for the mandrel at opposite ends thereof.

DETAILED DESCRIPTION

The invention is discussed in connection with one exemplary embodiment. The mandrel 1 has no axially through-going bore therein and has at one end thereof a first cone 2 which is received in a tool machine spindle 3. A taphole 4 is provided at the apex end of the first cone and receives a not shown but known tightening and setscrew therein. A radial flange 7 is provided between the central cylindrical part 6 of the mandrel, which supports a hob 5, and the said first cone 2, which flange has at least one recess or the like therein for receiving an anchor piece 8 or the like therein. An adjusting spring 9 or a different suitable member is used to prevent rotation of the hob relative to the cylindrical part of the mandrel 6.

A second cone 10 is provided at the other end of the mandrel and fits into a receiving part 11 secured to a bearing pin 12. The bearing pin 12 is rotatably supported in the support bearing 13 of the hobbing machine by known means.

The first and second cones 2 and 10 are external cones. A threaded pin 14 is connected to the cone 10 and cooperates with a tightening nut 15. The mandrel 6 and the spindle are fastened together with the centering second cone 10, the threaded pin 14 and the tightening nut 15. The spindle is secured on the tool machine by known means.

A thread 16 for a tightening nut 17 is provided on the mandrel between the cylindrical part of the mandrel 6 and the second cone. A ring piston 18 is movably supported in the tightening nut 17 so that it slightly projects from the tightening nut on the side thereof which faces the hob. A cylinder chamber 19 is provided on the side of the ring piston remote from the hob, which chamber is sealed off with a sealing collar 20 or the like. An end of a screw 21 terminates in the cylinder chamber 19 and is accessible from the outside. A liquid or plastic mass is located in the cylinder chamber 19 and constitutes the pressure or force transmitting media. A key can be utilized and engaged in for example openings 22 for tightening the nut 17 to bring the ring piston first to engage the hob, however, the actual clamping occurs by means of the screw 21 which reduces the volume in the cylinder chamber. The screw 21 requires only a very small torque for operation thereof. Length differences between the hob and the cylindrical part can be compensated for by the use of plates 23.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A mandrel for supporting on a tool receiving portion thereof a tool of a tool machine having a tool machine spindle means thereon, comprising:

a cone on both ends of said mandrel for facilitating a centering and a clamping of said mandrel in said tool machine spindle means;

an external thread intermediate one of said cones and said tool receiving portion;

stop means intermediate the other cone and said tool receiving portion;

an internally threaded tightening nut threadedly engaged with said external thread, said nut having on the side thereof facing said tool receiving portion means defining a single annular recess therein of uniform radial thickness and an annular piston reciprocally received in said recess and projecting axially from said nut, sliding seal means for sealing said piston to the walls of said recess, the axial spacing between said piston and the walls of said recess defining a single chamber;

fluid means in said chamber; and an adjusting screw on said nut, the inner end of which projects directly into said chamber for effecting a varying of the volume of said chamber and a displacement of said fluid means and causing an axial movement of said piston to effectively clamp said tool between said piston and said stop means.

2. The mandrel according to claim 1, wherein said adjusting means comprises an outwardly extending screw extending into said chamber, the inner end of which effects a change in the volume of said chamber in relation to the depth of penetration of said inner end of said screw into said chamber.

3. The mandrel according to claim 1, wherein said other cone has an axially extending internally threaded hole therein.

4. The mandrel according to claim 1, wherein said one cone has an axially extending threaded pin thereon.

5. The mandrel according to claim 1, wherein said fluid means is one of a liquid or a plastic mass.

6. The mandrel according to claim 1, including plural key receiving openings on the periphery of said nut to facilitate the initial adjustment of the position of said nut on said mandrel by the use of a key.

* * * * *